(12) United States Patent
Ota (10) Patent No.: US 9,500,110 B2
(45) Date of Patent: Nov. 22, 2016

(54) EXHAUST PURIFYING APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Hirohiko Ota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/987,187

(22) Filed: Jan. 4, 2016

(65) Prior Publication Data
US 2016/0222850 A1 Aug. 4, 2016

(30) Foreign Application Priority Data

Jan. 30, 2015 (JP) ................................ 2015-017242

(51) Int. Cl.
*F01N 3/023* (2006.01)
*F01N 3/10* (2006.01)
(Continued)

(52) U.S. Cl.
CPC ............. *F01N 3/0814* (2013.01); *F01N 3/023* (2013.01); *F01N 3/0821* (2013.01); *F01N 3/106* (2013.01); *F01N 3/20* (2013.01); *F01N 3/208* (2013.01); *F01N 3/2066* (2013.01); *F01N 13/009* (2014.06); *F02D 41/027* (2013.01); *F02D 41/0235* (2013.01); *F02D 41/1463* (2013.01); *F02D 43/04* (2013.01); *F02M 26/50* (2016.02); *F01N 2550/02* (2013.01); *F01N 2560/026* (2013.01); *F01N 2570/18* (2013.01); *F01N 2610/02* (2013.01); *F01N 2900/0416* (2013.01); *F01N 2900/1402* (2013.01);
(Continued)

(58) Field of Classification Search
CPC ...... F01N 13/00; F01N 3/0814; F01N 3/106; F01N 3/2066; F01N 3/208; F01N 3/023; F01N 3/20; F01N 3/0821; F01N 2570/18; F01N 2610/02; F01N 2900/0416; F01N 2900/1402; F01N 2900/1618; F02D 41/0235; F02D 41/1463; F02D 41/0245; F02D 41/027; F02D 41/1446; F02D 41/401; F02D 41/0055; F02D 2200/0802; F02D 2200/0804; F02M 2026/001
USPC ........................................... 60/277, 295, 301
See application file for complete search history.

(56) References Cited

U.S. PATENT DOCUMENTS

| 8,256,208 | B2 * | 9/2012 | Wills | ................... F01N 13/009 60/274 |
| 9,429,062 | B2 * | 8/2016 | Osburn | .............. B01D 53/9431 |
| 2014/0331752 | A1 * | 11/2014 | Hall | ........................ F01N 11/00 73/114.75 |

FOREIGN PATENT DOCUMENTS

| JP | 2003-097324 A | 4/2003 |
| JP | 2010-248925 A | 11/2010 |

*Primary Examiner* — Audrey K Bradley
*Assistant Examiner* — Dapinder Singh
(74) *Attorney, Agent, or Firm* — Oliff PLC (57) ABSTRACT

An exhaust purifying apparatus for an internal combustion engine includes a NOx removing catalyst, an oxidation catalyst, and a controller which is configured to calculate the amount of NOx contained in exhaust gas that has passed through the oxidation catalyst. The controller is configured to execute an abnormality diagnosis process that determines the existence of an abnormality in the NOx removing catalyst if NOx removal efficiency obtained from the amount of NOx is less than or equal to a predetermined value. The controller is configured to execute the abnormality diagnosis process after executing a desorption process that desorbs unburned fuel adsorbed by the NOx removing catalyst if an execution condition of the abnormality diagnosis process is met.

12 Claims, 8 Drawing Sheets

(51) Int. Cl.
*F01N 3/20* (2006.01)
*F01N 13/00* (2010.01)
*F02D 41/02* (2006.01)
*F02D 41/14* (2006.01)
*F01N 3/08* (2006.01)
*F02D 43/04* (2006.01)
*F02D 41/40* (2006.01)
*F02D 41/00* (2006.01)

(52) U.S. Cl.
CPC .. *F01N 2900/1618* (2013.01); *F02D 41/0055* (2013.01); *F02D 41/0245* (2013.01); *F02D 41/1446* (2013.01); *F02D 41/401* (2013.01); *F02D 2200/0802* (2013.01); *F02D 2200/0804* (2013.01); *F02M 2026/001* (2016.02)

| Leanness of Air-Fuel Ratio AF | Low ⟷ High |
|---|---|
| Air-Fuel Ratio Correction Coefficient K1 (K1>1) | Great ⟷ Small |

Fig.4

| Bed Temperature ST | Low ⟷ High |
|---|---|
| Temperature Correction Coefficient K2 (K2>1) | Great ⟷ Small |

Fig.5

| Leanness of Air-Fuel Ratio AF | Low ⟷ High |
|---|---|
| Air-Fuel Ratio Correction Coefficient K1 (0<K1<1) | Great ⟷ Small |

Fig.6

| Bed Temperature ST | Low ⟷ High |
|---|---|
| Temperature Correction Coefficient K2 (0<K2<1) | Great ⟷ Small |

Fig.8

(a) Actual Fuel Adsorption Amount (b) Execution Condition of Abnormality Diagnosis Process (c) Abnormality Diagnosis Process

EXHAUST PURIFYING APPARATUS FOR INTERNAL COMBUSTION ENGINE

BACKGROUND

The present disclosure relates to an exhaust purifying apparatus for an internal combustion engine.

Japanese Laid-Open Patent Publication No. 2010-248925 discloses an internal combustion engine that includes a nitrogen oxide (NOx) removing catalyst, which removes nitrogen oxides in exhaust gas. In the exhaust passage of such an internal combustion engine, an adding mechanism, which adds urea water into exhaust gas, is provided. Ammonia of the urea water is adsorbed by the NOx removing catalyst. The ammonia adsorbed by the NOx removing catalyst reduces and removes NOx. The NOx removing catalyst is gradually degraded with the duration of use and fails to provide desired NOx removing efficiency after extended use.

In the exhaust purifying apparatus disclosed in the above publication, an abnormality diagnosis process of the NOx removing catalyst is performed. In the abnormality diagnosis process, the NOx removal efficiency of the NOx removing catalyst is calculated on the basis of, for example, the NOx concentration in exhaust gas that has been purified by the NOx removing catalyst. If the calculated removal efficiency is less than or equal to a predetermined value, it is determined that there is a possibility of abnormality due to degradation of the NOx removing catalyst.

Exhaust purifying apparatuses have been proposed that include an oxidation catalyst, which removes ammonia that has desorbed from the NOx removing catalyst and ammonia that has passed through the NOx removing catalyst (i.e., without being adsorbed by the NOx removing catalyst), in the exhaust passage downstream of the NOx removing catalyst. In such exhaust purifying apparatuses, if the above-described abnormality diagnosis process is performed on the basis of the NOx removal efficiency obtained from the amount of NOx contained in exhaust gas that has passed through the oxidation catalyst, the following inconvenience may occur.

That is, if unburned fuel is contained in exhaust gas flowing into the NOx removing catalyst, the unburned fuel is adsorbed by the NOx removing catalyst. Since the unburned fuel that has been adsorbed by the NOx removing catalyst is desorbed from the NOx removing catalyst in accordance with the engine operating condition, the desorbed unburned fuel flows into the oxidation catalyst with the exhaust gas. If NOx is contained in the exhaust gas containing the unburned fuel, a NOx reduction reaction occurs in the oxidation catalyst due to the unburned fuel.

Thus, even in a case in which the amount of NOx in the exhaust gas after passing through the NOx removing catalyst is not sufficiently reduced due to degradation of the NOx removing catalyst, the amount of NOx contained in the exhaust gas after passing through the oxidation catalyst is reduced when the NOx reduction reaction occurs in the oxidation catalyst due to unburned fuel as described above. As a result, the determined NOx removal efficiency is increased compared to a case in which the NOx reduction reaction did not occur. Therefore, even if an abnormality occurs due to degradation of the NOx removing catalyst, an erroneous diagnosis, in which it is determined that there is no abnormality due to degradation of the NOx removing catalyst, may possibly occur in the above-described abnormality diagnosis process.

SUMMARY

Accordingly, it is an objective of embodiments to provide an exhaust purifying apparatus for an internal combustion engine that suppresses the occurrence of an erroneous diagnosis regarding abnormality due to degradation of a NOx removing catalyst.

To achieve the foregoing and/or other objectives and in accordance with one aspect of the present disclosure, an exhaust purifying apparatus for an internal combustion engine is provided that includes, a NOx removing catalyst, which is located in an exhaust passage and removes NOx in exhaust gas using urea water added to the exhaust gas, an oxidation catalyst, which is located at a part of the exhaust passage downstream of the NOx removing catalyst, and a controller which is configured to calculate an amount of NOx contained in exhaust gas that has passed through the oxidation catalyst. The controller also is configured to execute an abnormality diagnosis process that determines that there is an abnormality in the NOx removing catalyst if NOx removal efficiency obtained from the amount of NOx calculated by the NOx amount calculating section is less than or equal to a predetermined value. The controller is configured to execute the abnormality diagnosis process after executing a desorption process that desorbs unburned fuel adsorbed by the NOx removing catalyst if an execution condition previously set for performing the abnormality diagnosis process is met.

Other aspects and advantages of the disclosed embodiments will become apparent from the following description, taken in conjunction with the accompanying drawings, illustrating exemplary embodiments.

BRIEF DESCRIPTION OF THE DRAWINGS

Various aspects of the disclosure, including objects and advantages thereof, may best be understood by reference to the following description of the presently preferred embodiments together with the accompanying drawings in which.

DETAILED DESCRIPTION OF PREFERRED EMBODIMENTS

A control device 80 of an internal combustion engine according to one embodiment will now be described with reference to FIGS. 1 to 9.

Figure 1:
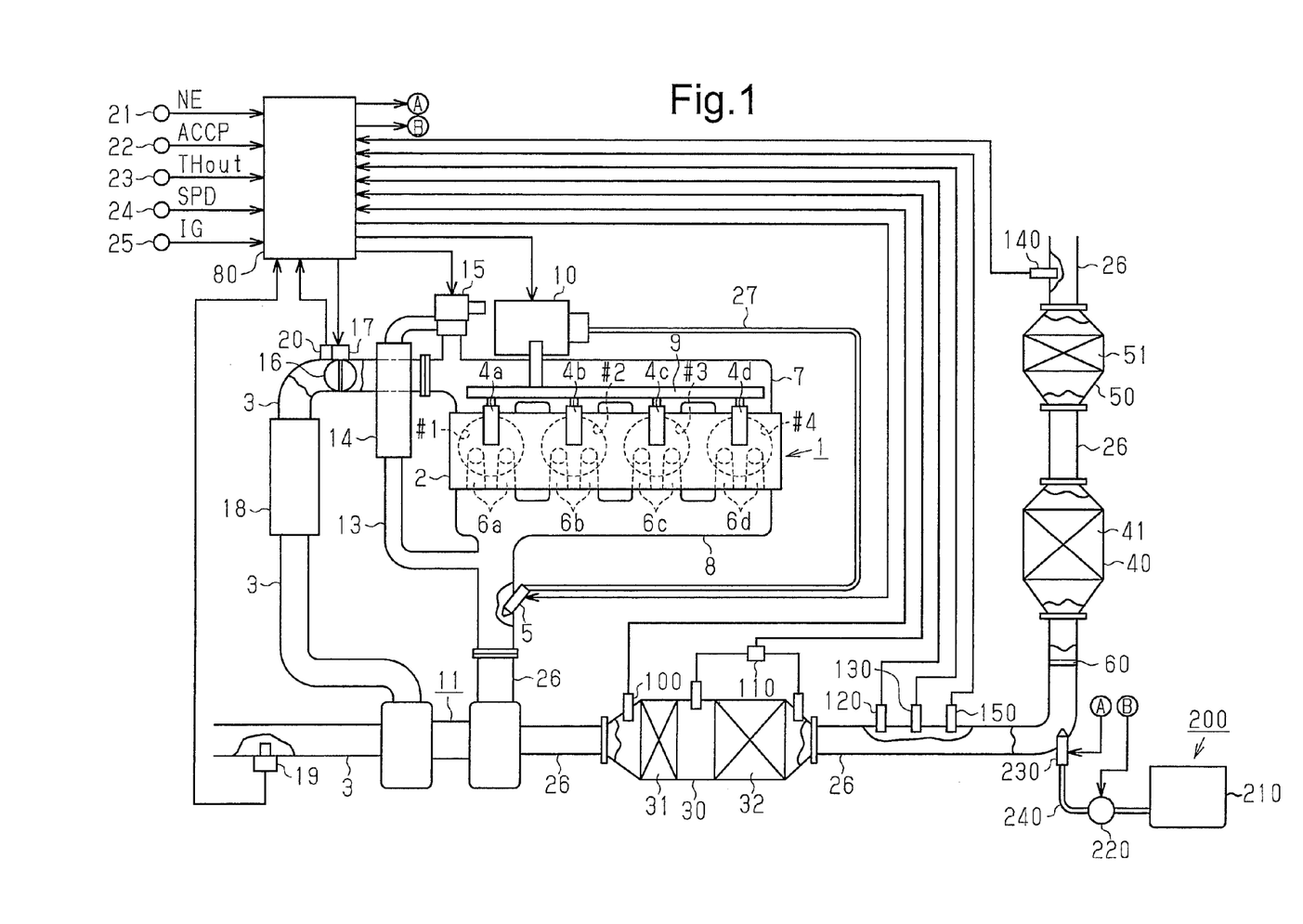
FIG. 1 is a schematic diagram of an exhaust purifying apparatus for an internal combustion engine according to a first embodiment showing the internal combustion engine and the surrounding structure.

FIG. 1 shows a vehicle-mounted diesel engine 1 (hereinafter, simply referred to as an engine 1), to which the control device 80 according to the present embodiment is applied, and the surrounding structure.

The engine 1 includes first to fourth cylinders #1 to #4. A cylinder head 2 includes fuel injection valves 4a to 4d corresponding to the cylinders #1 to #4. The fuel injection valves 4a to 4d each spray fuel into a combustion chamber of the corresponding one of the cylinders #1 to #4. The cylinder head 2 also includes non-illustrated intake ports for introducing fresh air into the cylinders #1 to #4 and exhaust ports 6a to 6d for discharging combustion gas to the outside of the cylinders #1 to #4. The intake ports and the exhaust ports 6a to 6d respectively correspond to the cylinders #1 to #4.

The fuel injection valves 4a to 4d are connected to a common rail 9, which accumulates high-pressure fuel. The common rail 9 is connected to a supply pump 10. The supply pump 10 takes in fuel from the non-illustrated fuel tank and supplies the common rail 9 with the high-pressure fuel. The high-pressure fuel supplied to the common rail 9 is sprayed into the cylinders #1 to #4 from the fuel injection valves 4a to 4d when the fuel injection valves 4a to 4d are opened.

An intake manifold 7 is connected to the intake ports. An intake passage 3 is connected to the intake manifold 7. An intake throttle valve 16 for adjusting the intake air amount is provided in the intake passage 3. The intake manifold 7 configures part of the intake passage 3.

An exhaust manifold 8 is connected to the exhaust ports 6a to 6d. An exhaust passage 26 is connected to the exhaust manifold 8.

A turbocharger 11 is provided in the middle of the exhaust passage 26. The turbocharger 11 supercharges the intake air by using the exhaust gas pressure to power the turbocharger 11. An intercooler 18 is provided in the intake passage 3 between an intake-side compressor of the turbocharger 11 and the intake throttle valve 16. The intercooler 18 cools the intake air, the temperature of which has been increased by supercharging of the turbocharger 11.

Furthermore, a first purifying member 30, which purifies exhaust gas, is provided in the middle of the exhaust passage 26 and downstream of the exhaust-side turbine of the turbocharger 11. An oxidation catalyst 31 and a filter 32 are arranged in series with respect to the flow direction of the exhaust gas inside the first purifying member 30.

The oxidation catalyst 31 carries a catalyst for oxidation of unburned fuel in the exhaust gas. Also, the filter 32 is configured by a porous ceramic, which is a member that traps particulate matter (PM) in the exhaust gas, and further carries a catalyst for promoting oxidation of the PM. The PM in the exhaust gas is trapped when passing the exhaust gas through a porous wall of the filter 32.

A fuel adding valve 5, which adds fuel to exhaust gas, is provided in the vicinity of a collective section of the exhaust manifold 8. The fuel adding valve 5 is connected to the supply pump 10 via a fuel supply pipe 27. The arrangement position of the fuel adding valve 5 may be changed as required as long as it is arranged in the exhaust system and upstream of the first purifying member 30. For example, fuel may be added to the exhaust gas by performing a post injection via fuel injection valves 4a to 4d by controlling the fuel injection timing.

When the amount of PM trapped by the filter 32 exceeds a predetermined value, a regeneration process of the filter 32 is started so that the fuel adding valve 5 sprays fuel to the exhaust gas in the exhaust manifold 8. The fuel added to the exhaust gas from the fuel adding valve 5 is oxidized when reaching the oxidation catalyst 31 so that the temperature of the exhaust gas is increased. When the exhaust gas, the temperature of which is increased by the oxidation catalyst 31, flows into the filter 32, the temperature of the filter 32 is increased. This causes the PM accumulated in the filter 32 to be oxidized to regenerate the filter 32.

Also, a second purifying member 40, which purifies the exhaust gas, is provided in the middle of the exhaust passage 26 and downstream of the first purifying member 30. A selective catalytic reduction NOx catalyst (hereinafter, referred to as a SCR catalyst) 41 is provided inside the second purifying member 40. The SCR catalyst 41 functions as a NOx removing catalyst, which reduces and removes NOx in the exhaust gas by using ammonia generated from urea water.

Furthermore, a third purifying member 50, which purifies the exhaust gas, is provided in the middle of the exhaust passage 26 and downstream of the second purifying member 40. An ammonia oxidation catalyst 51, which oxidizes and removes ammonia in exhaust gas, is provided inside the third purifying member 50.

A urea water supplying mechanism 200 is provided in the engine 1. The urea water supplying mechanism 200 functions as an adding mechanism, which adds the above-described urea water to exhaust gas. The urea water supplying mechanism 200 includes a tank 210 for storing urea water, a urea adding valve 230, which sprays urea water into the exhaust passage 26, a supply passage 240, which connects the urea adding valve 230 to the tank 210, and a pump 220 provided in the middle of the supply passage 240.

The urea adding valve 230 is located in the exhaust passage 26 between the first purifying member 30 and the second purifying member 40 and has an injection hole that opens toward the SCR catalyst 41. When the urea adding valve 230 is opened, urea water is sprayed into the exhaust passage 26 via the supply passage 240.

The pump 220 is an electric pump. When rotated forward, the pump 220 delivers urea water from the tank 210 toward the urea adding valve 230. When rotated in reverse, the pump 220 delivers urea water from the urea adding valve 230 toward the tank 210. That is, when the pump 220 is rotated in reverse, urea water is collected from the urea adding valve 230 and the supply passage 240, and is returned to the tank 210.

A dispersion plate 60 is also provided in the exhaust passage 26 between the urea adding valve 230 and the SCR catalyst 41. The dispersion plate 60 promotes atomization of the urea water by dispersing the urea water sprayed from the urea adding valve 230.

The urea water added to the exhaust gas from the urea adding valve 230 is hydrolyzed by the heat of the exhaust gas and turns into ammonia. When the ammonia reaches the SCR catalyst 41, the SCR catalyst 41 adsorbs the ammonia. The NOx in the exhaust gas is reduced and removed by using the ammonia adsorbed by the SCR catalyst 41.

In addition, the engine 1 is equipped with an exhaust gas recirculation apparatus (hereinafter, referred to as an EGR apparatus). More specifically, the EGR apparatus returns some of the exhaust gas to the intake passage 3 to reduce the combustion temperature in the cylinders #1 to #4 so that the amount of the NOx generated in the engine 1 is reduced. The EGR apparatus includes an EGR passage 13, which connects the intake manifold 7 to the exhaust manifold 8, an EGR valve 15, which is provided in the EGR passage 13, and an EGR cooler 14 located in the EGR passage 13. Adjusting the opening degree of the EGR valve 15 in accordance with the engine operating condition regulates the amount of exhaust gas returned from the exhaust passage 26 to the intake passage 3, that is, an EGR amount. Furthermore, the EGR cooler 14 lowers the temperature of the exhaust gas flowing in the EGR passage 13.

Various types of sensors for detecting the engine operating condition are mounted on the engine 1. For example, an air flow meter 19 detects an intake air amount GA. A throttle valve opening degree sensor 20 detects the opening degree of the intake throttle valve 16. A crank angle sensor 21 detects the engine speed NE. An accelerator sensor 22 detects the depression amount of the accelerator pedal, that is, the accelerator operation amount ACCP. An outside air temperature sensor 23 detects an outside air temperature THout. A vehicle speed sensor 24 detects a vehicle speed SPD of a vehicle in which the engine 1 is installed. The engine 1 also includes an ignition switch (hereinafter, referred to as an IG switch) 25, which is manipulated by the driver of the vehicle to start or stop the engine 1. The engine is started or stopped in accordance with the operation position of the IG switch 25.

Also, a first exhaust gas temperature sensor 100 located upstream of the oxidation catalyst 31 detects the temperature of exhaust gas before flowing into the oxidation catalyst 31, which is a first exhaust gas temperature TH1. A differential pressure sensor 110 detects a pressure difference ΔP between the exhaust gas pressure upstream of the filter 32 and the exhaust gas pressure downstream of the filter 32.

A second exhaust gas temperature sensor 120, a first NOx sensor 130, and an air-fuel ratio sensor 150 are provided in the exhaust passage 26 between the first purifying member 30 and the second purifying member 40, and upstream of the urea adding valve 230. The second exhaust gas temperature sensor 120 detects a second exhaust gas temperature TH2, which is the exhaust gas temperature before flowing into the SCR catalyst 41. As the temperature that correlates with the temperature of the SCR catalyst 41, the second exhaust gas temperature TH2 is more suitable than the above-described first exhaust gas temperature TH1. The first NOx sensor 130 outputs a signal corresponding to a first NOx concentration N1, which is the NOx concentration of the exhaust gas before flowing into the SCR catalyst 41. The detection signal output from the first NOx sensor 130 is subjected to a computation process of the control device 80, which will be discussed below, to obtain the first NOx concentration N1. The air-fuel ratio sensor 150 is a sensor that outputs signals corresponding to the oxygen concentration in the exhaust gas. The air-fuel ratio AF of the air-fuel mixture is detected on the basis of the output value of air-fuel ratio sensor 150.

A second NOx sensor 140 is provided in the exhaust passage 26 downstream of the third purifying member 50. The second NOx sensor 140 outputs a signal corresponding to a second NOx concentration N2, which is the NOx concentration of the exhaust gas that has passed through the ammonia oxidation catalyst 51 after being purified by the SCR catalyst 41. The detection signal output from the second NOx sensor 140 is subjected to a computation process of the control device 80, which will be discussed below, to obtain the second NOx concentration N2. That is, the control device 80 includes a NOx amount calculating section that calculates the first NOx concentration N1, which shows the amount of NOx contained in the exhaust gas before flowing into the SCR catalyst 41, and another NOx amount calculating section that calculates the second NOx concentration N2, which shows the amount of NOx contained in the exhaust gas that has passed through the ammonia oxidation catalyst 51.

The outputs of the various types of sensors are input to the control device 80, which serves as a controller. The control device 80 is a control circuit or a processor and is configured mainly of a microcomputer including, for example, a central processing unit (CPU), a read only memory (ROM), which previously stores various types of programs and maps, a random access memory (RAM), which temporarily stores computation results of the CPU, a time counter, an input interface, and an output interface.

The control device 80 performs various types of control procedures for the engine 1 such as fuel injection amount control and fuel injection timing control of the fuel injection valves 4a to 4d and the fuel adding valve 5, discharge pressure control of the supply pump 10, drive amount control of the actuator 17, which opens and closes the intake throttle valve 16, and opening degree control of the EGR valve 15.

The control device 80 performs various exhaust purification control procedures such as the above-described regeneration process, which burns the PM trapped by the filter 32.

The control device 80 also performs, as one of exhaust gas purification control procedures, urea water addition control by the urea adding valve 230. In the urea water addition control, a urea addition amount QE that is necessary for reducing the NOx discharged from the engine 1 is calculated on the basis of, for example, the engine operating condition. The opening state of the urea adding valve 230 is controlled such that the amount of urea water corresponding to the calculated urea addition amount QE is sprayed from the urea adding valve 230.

If unburned fuel, which includes fuel that did not burn in the combustion chambers of the engine 1 and fuel that was added from the above-described fuel adding valve 5, is contained in the exhaust gas that flows into the SCR catalyst 41, the SCR catalyst 41 adsorbs the unburned fuel. The unburned fuel that is adsorbed by the SCR catalyst 41 is desorbed from the SCR catalyst 41 in accordance with an increase in the temperature of the SCR catalyst 41 caused by an increase in the exhaust gas temperature. Thus, the higher the temperature of the exhaust gas that flows into the SCR catalyst 41, the lesser the amount of unburned fuel per unit time adsorbed by the SCR catalyst 41 (hereinafter, referred to as a unit fuel adsorption amount ABD).

The control device 80 performs a process for estimating the amount of unburned fuel adsorbed by the SCR catalyst 41 (hereinafter, referred to as a fuel adsorption amount AB) by estimating the unit fuel adsorption amount ABD and adding the estimated values over the passage of time.

In the estimation process of the fuel adsorption amount AB, first, the unit fuel adsorption amount ABD is calculated on the basis of the engine operating condition. More specifically, the unit fuel adsorption amount ABD is calculated on the basis of the fuel injection amount Q of the fuel injection valves and the engine rotational speed NE. In the present embodiment, the fuel injection amount Q is used as a value showing the engine load, but other values may be used as a value showing the engine load.

Figure 2:
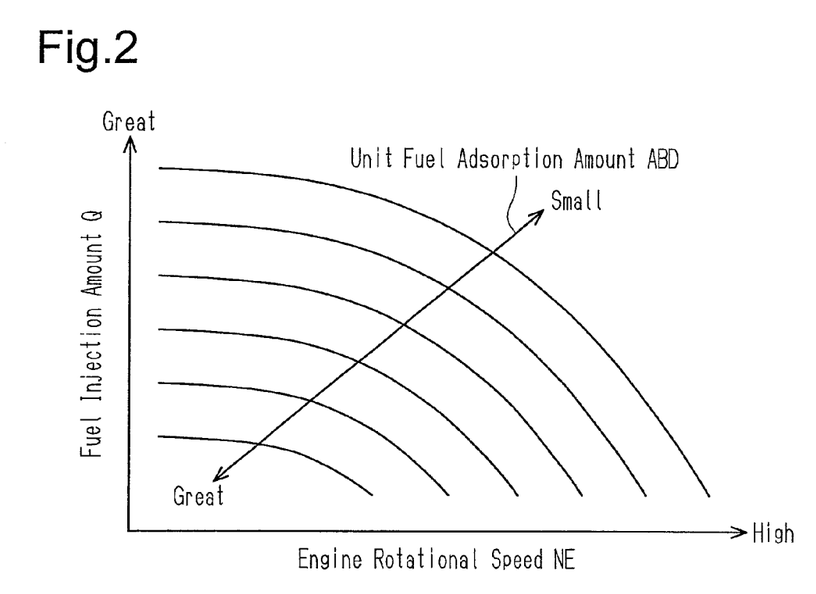
FIG. 2 is an estimation map for estimating the adsorption amount of unburned fuel by the SCR catalyst on the basis of the engine rotational speed and the fuel injection amount.

As shown in FIG. 2, the higher the engine rotational speed NE is, the lower the unit fuel adsorption amount ABD is set to be. This is because the higher the engine rotational speed NE, the higher the bed temperature ST of the SCR catalyst 41 becomes. This results in an increase in the desorption amount of the unburned fuel and, conversely, in a decrease in the adsorption amount of the unburned fuel. Furthermore, the greater the fuel injection amount Q, the lower the unit fuel adsorption amount ABD is set to be. This is because the greater the fuel injection amount Q and the higher the engine load, the higher the bed temperature ST of the SCR catalyst 41 becomes. This results in an increase in the desorption amount of the unburned fuel and, conversely, in a decrease in the adsorption amount of the unburned fuel.

Immediately after the engine operating condition has changed, change in the intake air amount and change in the bed temperature ST of the SCR catalyst 41 delay relative to the change in the engine operating condition. Thus, an error occurs in the above-described unit fuel adsorption amount ABD calculated on the basis of the fuel injection amount Q and the engine rotational speed NE in a transient period.

That is, the amount of unburned fuel adsorbed by the SCR catalyst 41 changes according to the amount of oxygen taken into the cylinders #1 to #4, as well as the above-mentioned bed temperature ST of the SCR catalyst 41. More specifically, the greater the amount of oxygen taken into the cylinders #1 to #4, the more promoted the oxidation of unburned fuel by the oxygen becomes in the cylinders #1 to #4. This results in a decrease in the amount of unburned fuel discharged to the exhaust passage 26. Thus, the greater the amount of oxygen taken into the cylinders #1 to #4, that is, the higher the leanness of the air-fuel ratio AF detected by the air-fuel ratio sensor 150, the lower the amount of unburned fuel adsorbed by the SCR catalyst 41.

Thus, during acceleration for example, increase in the intake air amount and also increase in the amount of oxygen taken into the cylinders #1 to #4 delay relative to the change in the engine operating condition. Thus, the unit fuel adsorption amount ABD calculated on the basis of the fuel injection amount Q and the engine rotational speed NE during acceleration undesirably becomes less than the actual adsorption amount, and an error occurs in the unit fuel adsorption amount ABD. Such an error is reduced as the delay in the increase in the intake air amount is diminished, that is, as the leanness of the air-fuel ratio AF is increased.

Furthermore, during acceleration, since increase in the bed temperature ST of the SCR catalyst 41 delays relative to the change in the engine operating condition, the unit fuel adsorption amount ABD calculated on the basis of the fuel injection amount Q and the engine rotational speed NE during acceleration undesirably becomes less than the adsorption amount corresponding to the actual bed temperature ST. Thus, an error occurs in the unit fuel adsorption amount ABD. Such an error is reduced as the delay in the increase in the bed temperature ST is diminished, that is, as the bed temperature ST during acceleration is increased.

During gradual deceleration, in which a small amount of fuel injection is performed, a delay occurs in the decrease in the intake air amount relative to the change in the engine operating condition, and a delay also occurs in the decrease in the amount of oxygen taken into the cylinders #1 to #4. Thus, the unit fuel adsorption amount ABD calculated on the basis of the fuel injection amount Q and the engine rotational speed NE during deceleration becomes undesirably greater than the actual adsorption amount, and an error occurs in the unit fuel adsorption amount ABD. Such an error is reduced as the delay in the decrease in the intake air amount is diminished, that is, as the leanness of the air-fuel ratio AF is reduced.

Furthermore, during gradual deceleration, in which a small amount of fuel injection is performed, a delay occurs in the decrease in the bed temperature ST of the SCR catalyst 41 relative to the change in the engine operating condition. Thus, the unit fuel adsorption amount ABD calculated on the basis of the fuel injection amount Q and the engine rotational speed NE during deceleration undesirably becomes greater than the adsorption amount corresponding to the actual bed temperature ST, and an error occurs in the unit fuel adsorption amount ABD. Such an error is reduced as the delay in the decrease in the bed temperature ST is diminished, that is, as the bed temperature ST during deceleration is reduced.

To suppress such errors of the unit fuel adsorption amount ABD in a transient period of the engine operating condition, the control device 80 determines whether the current engine operating condition is in an accelerating state, a decelerating state, or a steady state. Such diagnosis is made on the basis of the degree of depression of the acceleration pedal ACCP and the tendency in the increase and decrease of the fuel injection amount Q.

The control device 80 calculates an air-fuel ratio correction coefficient K1 on the basis of the air-fuel ratio AF and a temperature correction coefficient K2 on the basis of the bed temperature ST of the SCR catalyst 41. The control device 80 then corrects the unit fuel adsorption amount ABD by multiplying the unit fuel adsorption amount ABD by the air-fuel ratio correction coefficient K1 and the temperature correction coefficient K2.

More specifically, if it is determined that the current engine operating condition is in the accelerating state, the control device 80 selects the air-fuel ratio correction coefficient map and the temperature correction coefficient map that are optimized for acceleration.

Figure 3:
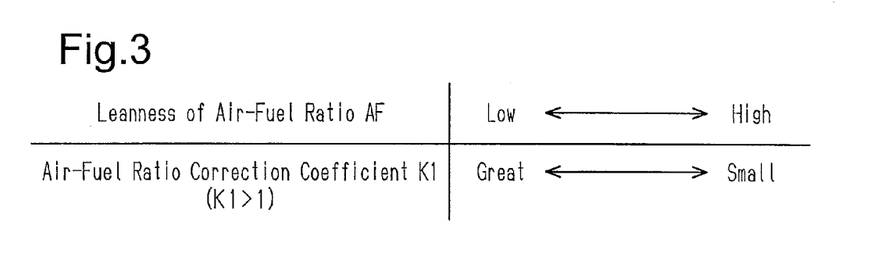
FIG. 3 is a diagram showing the correspondence between the air-fuel ratio and the air-fuel ratio correction coefficient during acceleration.

As shown in FIG. 3, in the air-fuel ratio correction coefficient map that is optimized for acceleration, the lower the leanness of the air-fuel ratio AF, that is, the smaller the value of the air-fuel ratio AF and the smaller the amount of oxygen taken into the cylinders #1 to #4, the greater the value of the air-fuel ratio correction coefficient K1 is set to be. The air-fuel ratio correction coefficient K1 set during acceleration is a value greater than one. Thus, the smaller the amount of oxygen taken into the cylinders #1 to #4 and the smaller the amount of oxidation of the unburned fuel, the greater the value of the air-fuel ratio correction coefficient K1 becomes so that the unit fuel adsorption amount ABD is corrected to be increased. This suppresses the occurrence of errors in the unit fuel adsorption amount ABD during acceleration as described above.

Figure 4:
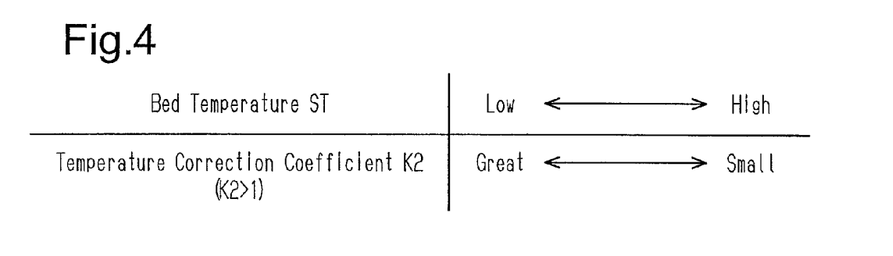
FIG. 4 is a diagram showing the correspondence between the bed temperature and the temperature correction coefficient during acceleration.

As shown in FIG. 4, in the temperature correction coefficient map that is optimized for acceleration, the lower the bed temperature ST of the SCR catalyst 41, the greater the value of the temperature correction coefficient K2 is set to be. The temperature correction coefficient K2 set during acceleration is also a value greater than one. Thus, the lower the bed temperature ST and the smaller the amount of unburned fuel desorbed from the SCR catalyst 41, the greater the value of the temperature correction coefficient K2 becomes so that the unit fuel adsorption amount ABD is corrected to be increased. This suppresses the occurrence of errors in the unit fuel adsorption amount ABD during acceleration as described above.

The bed temperature ST is estimated on the basis of the exhaust gas temperature and the like. For example, the bed temperature ST is estimated using various parameters regarding heat balance of the SCR catalyst 41 such as the second exhaust gas temperature TH2, which is the temperature of the exhaust gas that flows into the SCR catalyst 41, the flow rate of exhaust gas, which influences the amount of heat per unit time transmitted from the exhaust gas to the SCR catalyst 41, and the outside-air temperature and the vehicle speed SPD, which influence the amount of heat per unit time transmitted from the SCR catalyst 41 to the outside air. The bed temperature ST may also be directly detected by providing a temperature sensor in the SCR catalyst 41.

Figure 5:
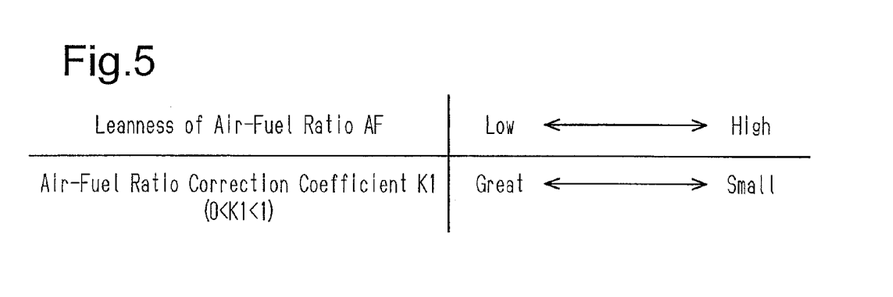
FIG. 5 is a diagram showing the correspondence between the air-fuel ratio and the air-fuel ratio correction coefficient during deceleration.
Figure 6:
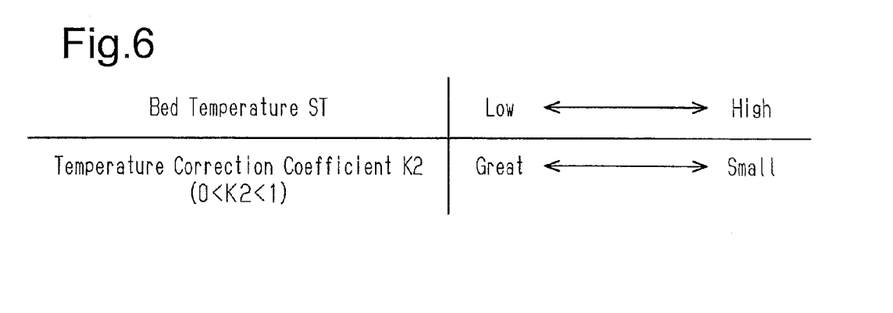
FIG. 6 is a diagram showing the correspondence between the bed temperature and the temperature correction coefficient during deceleration.

If it is determined that the current engine operating condition is in a decelerating state, the control device 80 selects the air-fuel ratio correction coefficient map and the temperature correction coefficient map that are optimized for deceleration.

As shown in FIG. 5, in the air-fuel ratio correction coefficient map that is optimized for deceleration, the higher the leanness of the air-fuel ratio AF, that is, the greater the value of the air-fuel ratio AF and the greater the amount of oxygen taken into the cylinders #1 to #4, the smaller the value of the air-fuel ratio correction coefficient K1 is set to be. The air-fuel ratio correction coefficient K1 set during deceleration is a value within a range greater than zero and less than one. Thus, the greater the amount of oxygen taken into the cylinders #1 to #4 and the greater the amount of oxidation of the unburned fuel, the smaller the value of the air-fuel ratio correction coefficient K1 becomes so that the unit fuel adsorption amount ABD is corrected to be reduced. This suppresses the occurrence of errors in the unit fuel adsorption amount ABD during deceleration as described above.

As shown in FIG. 6, in the temperature correction coefficient map that is optimized for deceleration, the higher the bed temperature ST of the SCR catalyst 41, the smaller the value of the temperature correction coefficient K2 is set to be. The air-fuel ratio correction coefficient K2 set during deceleration is a value within a range greater than zero and less than one. Thus, the higher the bed temperature ST and the greater the amount of the unburned fuel desorbed from the SCR catalyst 41, the smaller the value of the temperature correction coefficient K2 becomes so that the unit fuel adsorption amount ABD is corrected to be reduced. This suppresses the occurrence of errors in the unit fuel adsorption amount ABD during deceleration as described above.

If the current engine operating condition is neither in an accelerating state nor in a decelerating state, the control device 80 determines that the current engine operating condition is in the steady state. In this case, the values of the air-fuel ratio correction coefficient K1 and the temperature correction coefficient K2 are both set to one. Thus, if the engine operating condition is in the steady state, the value of the unit fuel adsorption amount ABD calculated on the basis of the fuel injection amount Q and the engine rotational speed NE is the same as the value of the corrected unit fuel adsorption amount ABD.

The control device 80 estimates the fuel adsorption amount AB of the SCR catalyst 41 by adding this corrected unit fuel adsorption amount ABD at every predetermined cycle.

The control device 80 executes an abnormality diagnosis process for determining whether there is an abnormality due to degradation of the SCR catalyst 41. The abnormality due to degradation refers to a state in which the NOx removal efficiency of the SCR catalyst 41 is decreased to a predetermined diagnosis value or less due to thermal degradation of the SCR catalyst 41 and in which the SCR catalyst 41 fails to remove a sufficient amount of NOx. In the abnormality diagnosis process, the control device 80 calculates the NOx removal efficiency using the following expression (1): {(first NOx concentration N1−second NOx concentration N2)/first NOx concentration N1}×100(%). The control device 80 determines whether the NOx removal efficiency of the SCR catalyst 41 is less than or equal to the predetermined diagnosis value. If it is determined that the NOx removal efficiency of the SCR catalyst 41 is less than or equal to the predetermined diagnosis value, the control device 80 determines that there is an abnormality due to degradation of the SCR catalyst 41. If it is determined that there is an abnormality due to degradation of the SCR catalyst 41, the control device 80 informs the vehicle driver of the abnormality in the SCR catalyst 41 due to degradation using various notification methods (such as sound and light).

As described above, since the unburned fuel adsorbed by the SCR catalyst 41 is desorbed when the temperature of the exhaust gas is increased, the desorbed unburned fuel flows into the ammonia oxidation catalyst 51 together with the exhaust gas. If NOx is contained in the exhaust gas containing the unburned fuel, the NOx reduction reaction with the unburned fuel occurs in the ammonia oxidation catalyst 51.

Thus, even in a case in which the amount of NOx in the exhaust gas that has passed through the SCR catalyst 41 is not sufficiently reduced due to degradation of the SCR catalyst 41, the amount of NOx contained in the exhaust gas after passing through the ammonia oxidation catalyst 51 is reduced when the NOx reduction reaction with the unburned fuel is occurring in the ammonia oxidation catalyst 51. Thus, the second NOx concentration N2 detected by the second NOx sensor 140 located downstream of the ammonia oxidation catalyst 51 with respect to the flow direction of the exhaust gas is also reduced, and the NOx removal efficiency calculated by using the above-described expression (1) becomes higher than that in a case in which the NOx reduction reaction with the unburned fuel is not occurring. Thus, in the above-mentioned abnormality diagnosis process, the NOx removal efficiency becomes higher than the diagnosis value even if an abnormality occurs due to degradation of the SCR catalyst 41, and an erroneous diagnosis may possibly occur in which it is determined that there is no abnormality in the SCR catalyst 41 due to degradation.

Figure 7:
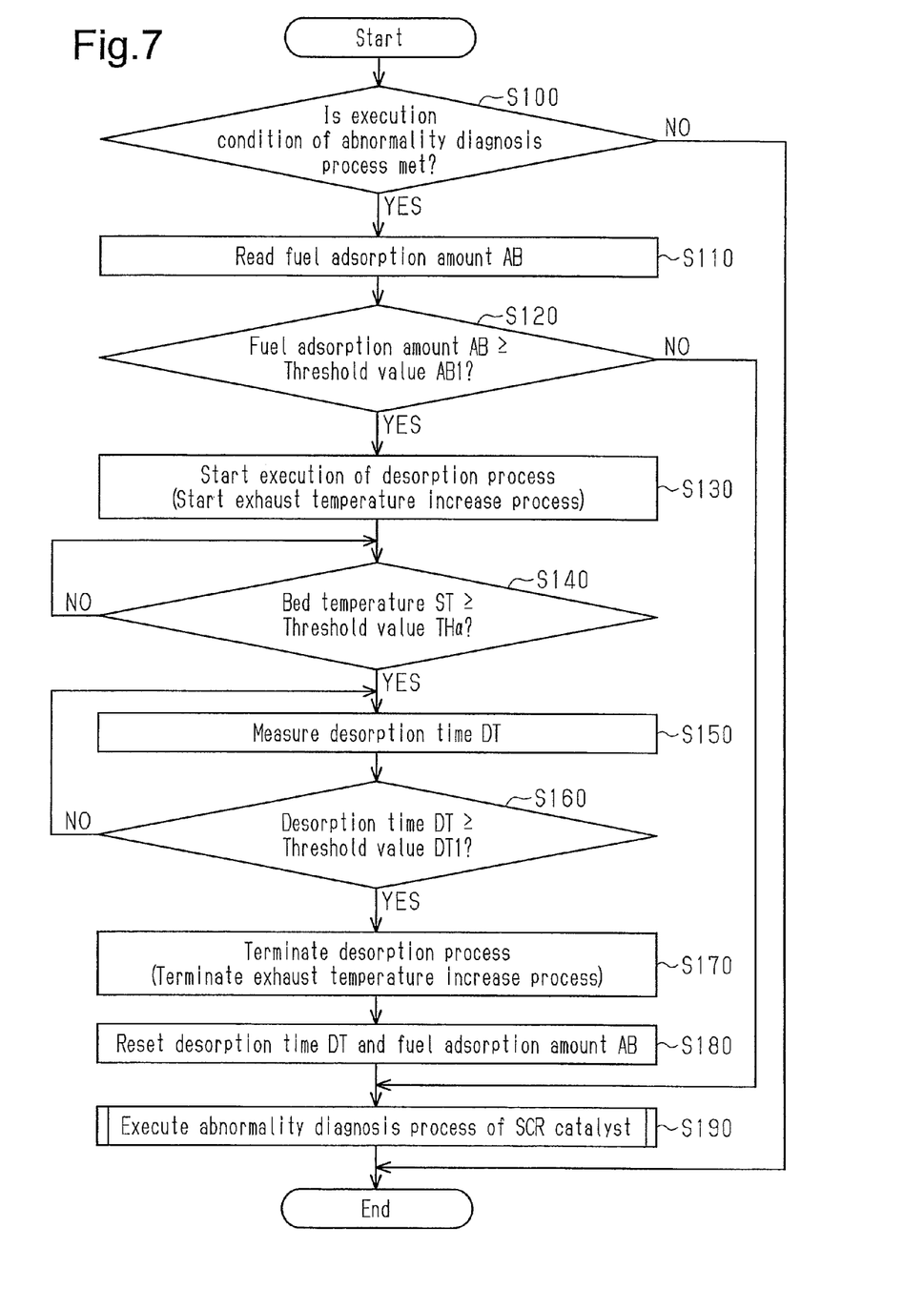
FIG. 7 is a flowchart showing a series of steps of a routine when an abnormality diagnosis of the SCR catalyst is performed according to the present embodiment.

The control device 80 suppresses the occurrence of an erroneous diagnosis regarding an abnormality of the SCR catalyst 41 due to degradation by performing a series of steps shown in FIG. 7 when executing the above-mentioned abnormality diagnosis process.

As shown in FIG. 7, the control device 80 first determines whether the execution condition of the abnormality diagnosis process of the SCR catalyst 41 is met (S100). The execution condition may be changed as necessary. For example, in the present embodiment, the execution condition of the abnormality diagnosis process is met when the following conditions are all met:

The vehicle travel distance from when the IG switch 25 is switched on is greater than or equal to a predetermined value.

The change amount of the vehicle speed SPD and the change amount of the engine rotational speed NE are both within a predetermined range, and the operating condition of the engine 1 is in the steady state.

The number of times the abnormality diagnosis of the SCR catalyst 41 has been executed is less than or equal to a predetermined value.

If the execution condition of the abnormality diagnosis process is not met (S100: NO), the control device 80 temporarily suspends the series of steps.

If the execution condition of the abnormality diagnosis process is met (S100: YES), the control device 80 reads the current fuel adsorption amount AB calculated by the above-mentioned estimation process (S110) and determines whether the fuel adsorption amount AB is greater than or equal to a threshold value AB1 (S120). The greater the amount of unburned fuel adsorbed by the SCR catalyst 41, the greater the amount of NOx reduced by the unburned fuel in the ammonia oxidation catalyst 51 becomes. Thus, the possibility that an erroneous diagnosis will occur during execution of the abnormality diagnosis process is increased. Therefore, as the threshold value AB1, the fuel adsorption amount that may cause an erroneous diagnosis during execution of the abnormality diagnosis process is determined in advance based on experimentation.

If the fuel adsorption amount AB is less than the threshold value AB1 (S120: NO), there is a low possibility that the above-described erroneous diagnosis will occur. In this case, the control device 80 immediately executes the above-mentioned abnormality diagnosis process of the SCR catalyst 41 (S190) and temporarily suspends this routine.

If the fuel adsorption amount AB is greater than or equal to the threshold value AB1 (S120: YES), there is a high possibility that the above-described erroneous diagnosis will occur. In this case, the control device 80 starts a desorption process, which desorbs the unburned fuel adsorbed by the SCR catalyst 41 (S130). In the present embodiment, a temperature increase process, which increases the temperature of the exhaust gas that flows into the SCR catalyst 41, is performed as the desorption process. As such a temperature increase process, for example, one of the following processes may be performed independently or some of the following processes may be performed in combination:

A regeneration process of the filter 32 by adding fuel from the fuel adding valve 5.

A process for correcting the fuel injection timing of the fuel injection valves 4a to 4d to be retarded. When the fuel injection timing is retarded, the time period from when combustion of the air-fuel mixture has started to when the exhaust valves of the engine 1 are opened is reduced. Thus, the combustion gas is discharged to the exhaust passage 26 at a time when the temperature decrease of the combustion gas is relatively small so that the exhaust gas temperature is increased.

A process to increase the amount of EGR that is returned to the intake passage 3 by the EGR apparatus. When the EGR amount is increased, the temperature of the intake air taken into the combustion chambers is increased so that the exhaust gas temperature is also increased.

A process to reduce the intake air amount of the engine 1 by controlling the opening degree of the intake throttle valve 16. When the intake air amount is reduced, the proportion of fresh air having a relatively low temperature is reduced in the intake air containing EGR gas and fresh air that flows to the combustion chambers. Thus, the temperature of the intake air taken into the combustion chambers is increased so that the exhaust gas temperature is increased.

When the desorption process is started, the control device 80 determines whether the bed temperature ST of the SCR catalyst 41 after starting the desorption process is greater than or equal to a threshold value TH$\alpha$ (S140). The bed temperature ST of the SCR catalyst 41 suitable for desorbing the unburned fuel adsorbed by the SCR catalyst 41 is previously set as the threshold value TH$\alpha$.

If the bed temperature ST is less than the threshold value TH$\alpha$ (S140: NO), the control device 80 repeats the diagnosis process of step S140 until the bed temperature ST becomes greater than or equal to the threshold value TH$\alpha$.

If the bed temperature ST becomes greater than or equal to the threshold value TH$\alpha$ (S140: YES), the control device 80 then measures a desorption time DT (S150). The desorption time DT is a time that has elapsed from when the bed temperature ST reached the threshold value TH$\alpha$.

Subsequently, the control device 80 determines whether the desorption time DT is greater than or equal to a threshold value DT1 (S160). The desorption time DT that is required for desorbing all the unburned fuel adsorbed by the SCR catalyst 41 is previously set as the threshold value DT1.

If the desorption time DT is less than the threshold value DT1 (S160: NO), the control device 80 repeats the process of step S150 and the process of step S160 until the desorption time DT becomes greater than or equal to the threshold value DT1.

When the desorption time DT becomes greater than or equal to the threshold value DT1, the control device 80 terminates the desorption process (S170) and resets the desorption time DT and the fuel adsorption amount AB to zero (S180). When the desorption process is terminated, the control device 80 executes the abnormality diagnosis process of the above-mentioned SCR catalyst 41 (S190) and temporarily suspends the routine.

Operation of the present embodiment will now be described with reference to FIGS. 8 and 9.

Figure 8:
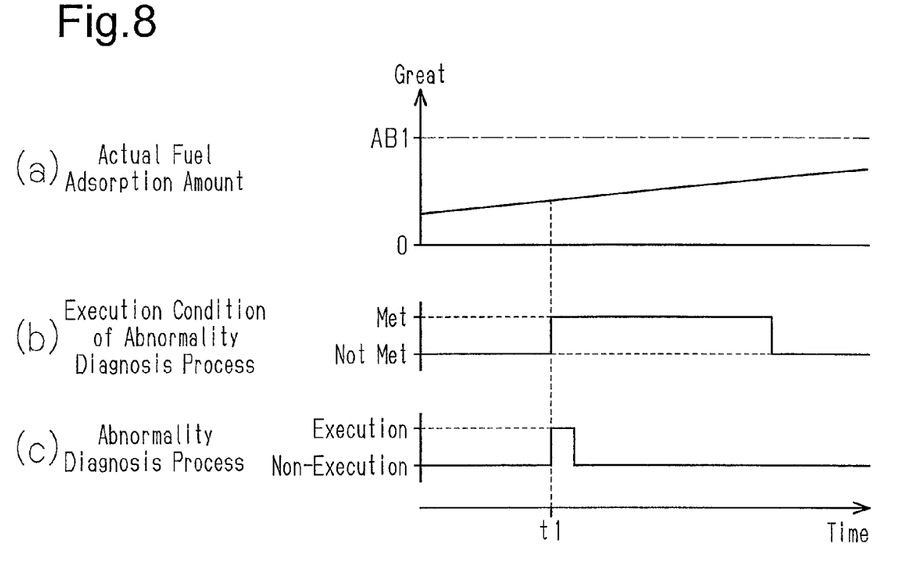
FIG. 8 is a time diagram showing a state in which an abnormality diagnosis process is performed when a desorption process is not executed according to the present embodiment.

As shown in FIG. 8, the actual fuel adsorption amount of the SCR catalyst 41 increases as the time elapses. If the fuel adsorption amount AB at the time when the execution condition of the abnormality diagnosis process is met is less than the threshold value AB1 (time t1), the amount of unburned fuel desorbed from the SCR catalyst 41 is small. Thus, the amount of NOx reduced by the unburned fuel in the ammonia oxidation catalyst 51 is also small. For this reason, there is a low possibility that an erroneous diagnosis will occur when the abnormality diagnosis process of the SCR catalyst 41 is executed. In this case, the abnormality diagnosis process of the SCR catalyst 41 is immediately performed without executing the desorption process.

Figure 9:
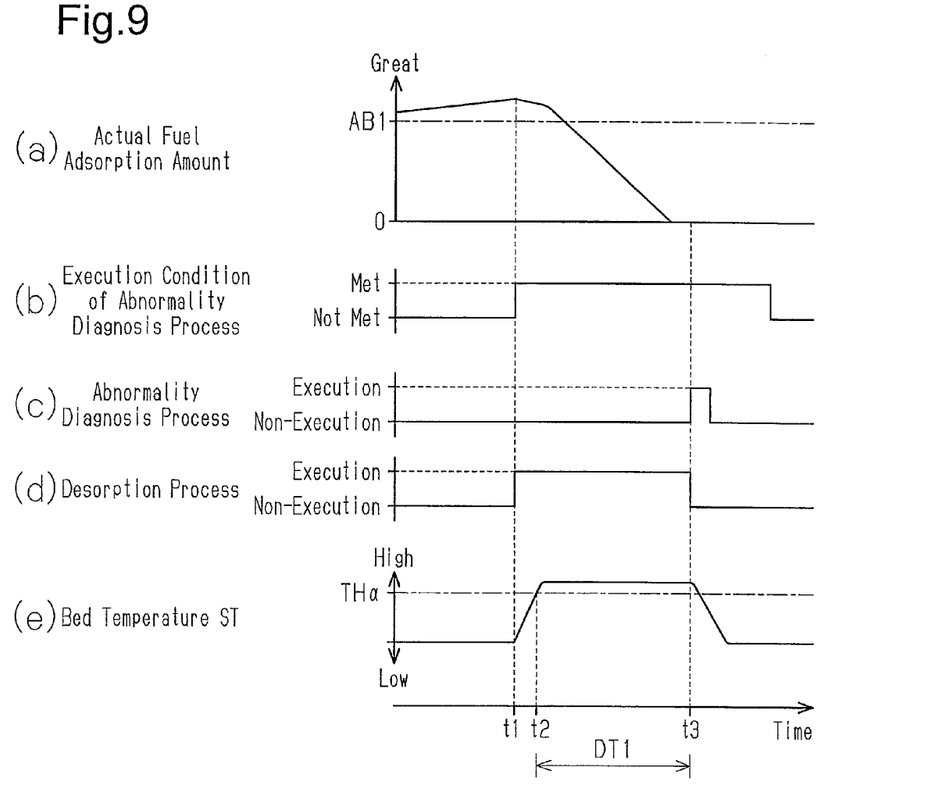
FIG. 9 is a time diagram showing a state in which the abnormality diagnosis process is performed when the desorption process is executed according to the present embodiment.

As shown in FIG. 9, if the fuel adsorption amount AB at the time when the execution condition for the abnormality diagnosis process is met is greater than or equal to the threshold value AB1 (time t1), the amount of unburned fuel separated from the SCR catalyst 41 is great. Thus, the amount of NOx reduced by the unburned fuel in the ammonia oxidation catalyst 51 is also increased. For this reason, there is a high possibility that an erroneous diagnosis will occur when the abnormality diagnosis process of the SCR catalyst 41 is executed. In this case, prior to execution of the abnormality diagnosis process, the desorption process for desorbing the unburned fuel adsorbed by the SCR catalyst 41 is started (time t1). When the desorption process is started, the temperature of the exhaust gas that flows into the SCR catalyst 41 is increased. Thus, the temperature of the SCR catalyst 41 increases after time t1 so that the unburned fuel is gradually desorbed from the SCR catalyst 41. As a result, the actual fuel adsorption amount of the SCR catalyst 41 is gradually reduced after time t1.

As shown in (e) of FIG. 9, when the bed temperature ST reaches the threshold value THα by the execution of the desorption process (time t2), measurement of the desorption time DT is started. When the desorption time DT reaches the threshold value DT1 (time t3), the desorption process is terminated, and the abnormality diagnosis process of the SCR catalyst 41 is executed. Since almost all the unburned fuel adsorbed by the SCR catalyst 41 has desorbed at the point in time when the desorption process is terminated (time t3), the actual fuel adsorption amount of the SCR catalyst 41 is almost zero.

As described above, the abnormality diagnosis process is executed after executing the desorption process. Thus, when executing the abnormality determination process, the amount of unburned fuel in the exhaust gas that flows into the ammonia oxidation catalyst 51 is reduced as compared to that before executing the desorption process. This suppresses the NOx reduction reaction with the unburned fuel in the ammonia oxidation catalyst 51, thus reducing the difference between the amount of NOx in the exhaust gas purified by the SCR catalyst 41 and the amount of NOx in the exhaust gas that has passed through the ammonia oxidation catalyst 51. As a result, the NOx removal efficiency calculated on the basis of the amount of NOx contained in the exhaust gas that has passed through the ammonia oxidation catalyst 51 appropriately reflects the degree of degradation of the SCR catalyst 41. This suppresses the occurrence of an erroneous diagnosis, in which it is determined that there is an abnormality due to degradation of the SCR catalyst 41, when the abnormality diagnosis process is executed to determine the existence of abnormality due to degradation of the SCR catalyst 41 on the basis of the NOx removal efficiency.

As described above, the present embodiment has the following advantages.

(1) When the execution condition of the abnormality diagnosis process of the SCR catalyst 41 is met, the control device 80 executes the abnormality diagnosis process after executing the desorption process for desorbing the unburned fuel adsorbed by the SCR catalyst 41. This suppresses the occurrence of an erroneous diagnosis regarding an abnormality due to degradation of the SCR catalyst 41.

(2) If the fuel adsorption amount AB of the SCR catalyst 41 is greater than or equal to the threshold value AB1, and there is a high possibility of the occurrence of an erroneous diagnosis when executing the abnormality diagnosis process of the SCR catalyst 41, the control device 80 executes the desorption process. This more reliably suppresses the occurrence of an erroneous diagnosis regarding an abnormality due to degradation of the SCR catalyst 41.

(3) If the fuel adsorption amount AB of the SCR catalyst 41 is less than the threshold value AB1, and there is a low possibility of the occurrence of an erroneous diagnosis when executing the abnormality diagnosis process of the SCR catalyst 41, the control device 80 executes the abnormality diagnosis process without executing the desorption process. Thus, the abnormality diagnosis process is promptly executed as compared to a case in which the desorption process is executed prior to execution of the abnormality diagnosis process.

(4) The control device 80 executes the temperature increase process for increasing the temperature of the exhaust gas that flows into the SCR catalyst 41 as the desorption process. Thus, the unburned fuel adsorbed by the SCR catalyst 41 is actually desorbed.

(5) Since the control device 80 executes the desorption process until the predetermined time (the threshold value DT1) elapses, the desorption process is executed until almost all the unburned fuel adsorbed by the SCR catalyst 41 is desorbed.

(6) When estimating the fuel adsorption amount AB of the SCR catalyst 41 in a transient period of the engine operating condition, the control device 80 calculates the air-fuel ratio correction coefficient K1 and the temperature correction coefficient K2 suitable for a transient period and corrects the fuel adsorption amount AB. This increases the estimation accuracy of the fuel adsorption amount AB.

The above-described embodiment may be modified as follows.

In the above-described embodiment, the desorption process is executed until the desorption time DT reaches the threshold value DT1. However, in a second embodiment, the desorption process may be executed until the adsorption amount of the unburned fuel in the SCR catalyst 41 becomes less than or equal to a predetermined amount. For example, the second embodiment may be configured as follows.

Figure 10:
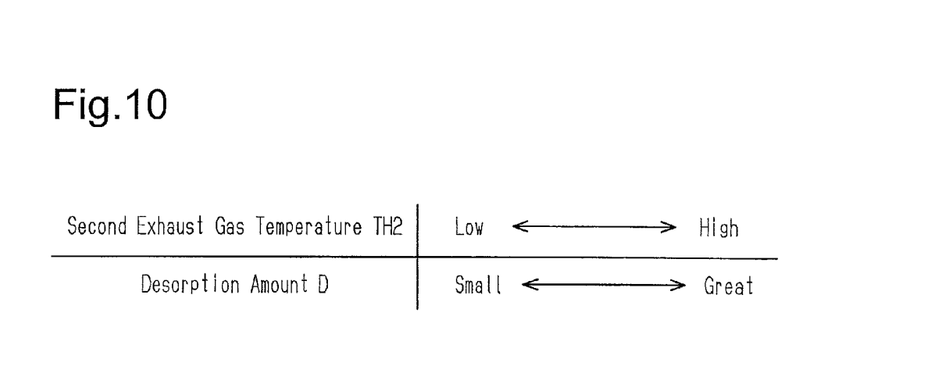
FIG. 10 is a diagram showing the correspondence between the desorption amount of unburned fuel and the exhaust gas temperature when the desorption process is being performed according to a second embodiment.

First, the amount of unburned fuel desorbed from the SCR catalyst 41 during execution of the desorption process is increased as the temperature of the exhaust gas that flows into the SCR catalyst 41 during execution of the desorption process is increased. Given this factor, the control device 80 executes a desorption amount estimation process for estimating the desorption amount of the unburned fuel desorbed from the SCR catalyst 41 on the basis of the exhaust gas temperature during execution of the desorption process. More specifically, the exhaust gas temperature after starting the desorption process, or preferably the above-described second exhaust gas temperature TH2, which is the temperature of the exhaust gas that flows into the SCR catalyst 41, is read at every predetermined cycle. On the basis of the obtained exhaust gas temperature, a desorption amount of the unburned fuel D per unit time desorbed from the SCR catalyst 41 is calculated. As shown in FIG. 10, for example, the higher the second exhaust gas temperature TH2, the greater the value of the desorption amount D is set to be. The control device 80 estimates the fuel adsorption amount AB after starting the desorption process by sequentially subtracting the desorption amount D calculated at every predetermined cycle from the fuel adsorption amount AB obtained when the desorption process is started.

Since the temperature of the SCR catalyst 41 during execution of the desorption process is high, the amount of unburned fuel additionally adsorbed by the SCR catalyst 41 is very small. It is assumed that the fuel adsorption amount AB when the desorption process is started is a reference value. The fuel adsorption amount AB after the desorption process is started can also be appropriately estimated by sequentially subtracting the desorption amount D from the reference value.

Figure 11:
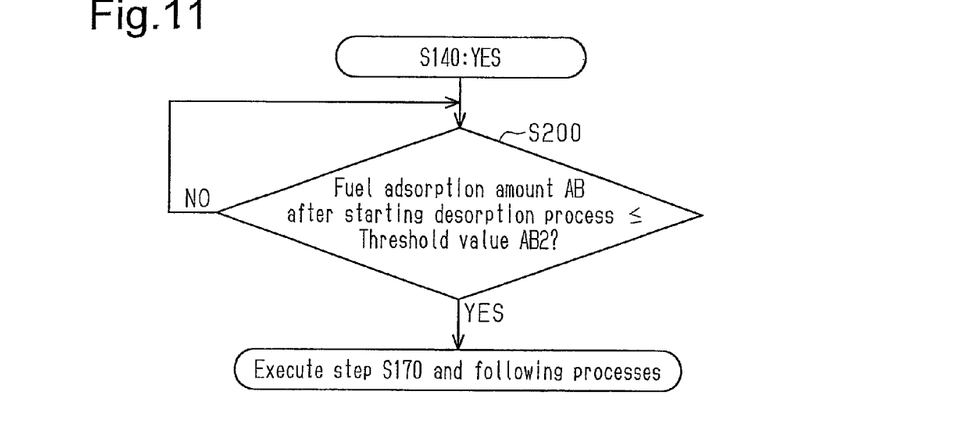
FIG. 11 is a flowchart showing part of the series of steps of the routine when performing the abnormality diagnosis of the SCR catalyst according to the second embodiment.

Instead of step S150 and step S160 of the routine according to the first embodiment shown in FIG. 7, a process of step S200 shown in FIG. 11 is executed.

As shown in FIG. 11, in the second embodiment, if the decision outcome of step S140 is positive, the control device 80 determines whether the fuel adsorption amount AB after starting the desorption process estimated in the above-described aspect is less than or equal to a threshold value AB2 (S200). The threshold value AB2 is set to zero.

If the fuel adsorption amount AB after starting the desorption process is not less than or equal to the threshold value AB2 (S200: NO), the control device 80 repeats the process of step S200 until the fuel adsorption amount AB after starting the desorption process becomes less than or equal to the threshold value AB2.

If the fuel adsorption amount AB after starting the desorption process becomes less than or equal to the threshold value AB2 (S200: YES), the control device 80 executes, as in the first embodiment, the aforementioned process of step S170 and the following processes. That is, the control device 80 terminates the desorption process (S170) and resets only the fuel adsorption amount AB (S180) instead of resetting the desorption time DT and the fuel adsorption amount AB. Subsequently, the control device 80 executes the above-described abnormality diagnosis process of the SCR catalyst 41.

Figure 12:
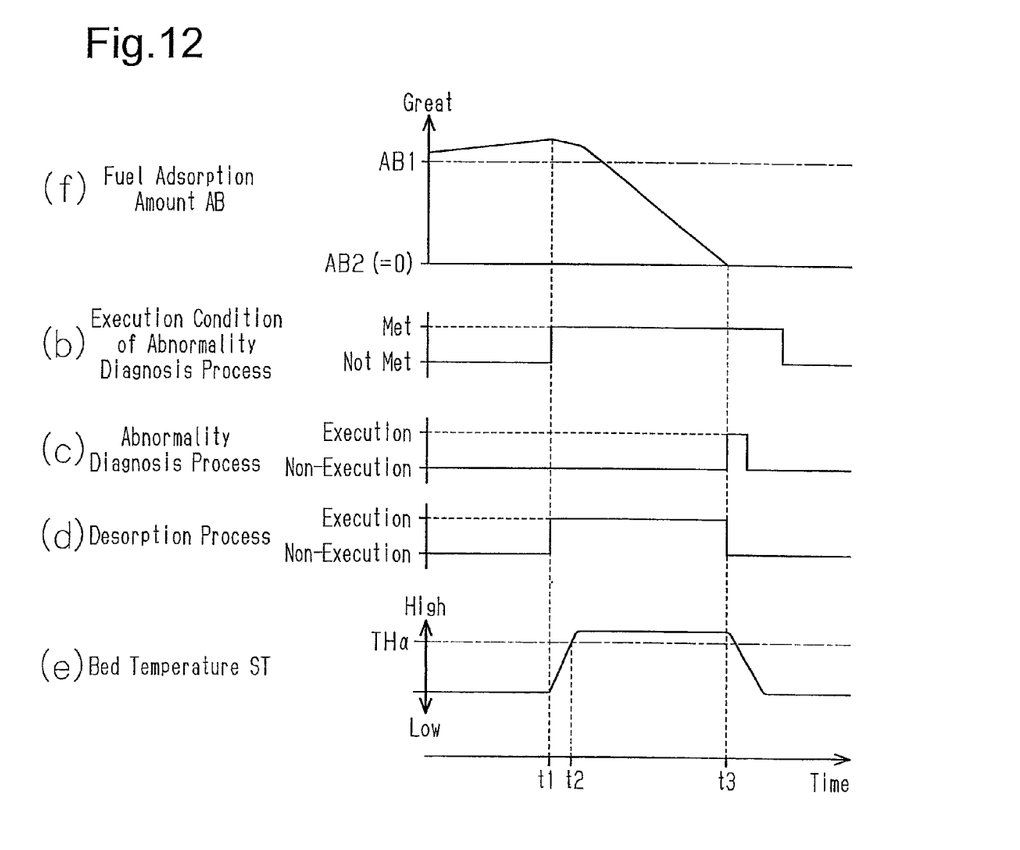
FIG. 12 is a time diagram showing a state in which the desorption process and the abnormality diagnosis process are executed according to the second embodiment.

As shown in FIG. 12, in the second embodiment, when the fuel adsorption amount AB from when the desorption process is started is reduced to the threshold value AB2, that is, when the fuel adsorption amount AB becomes zero (time t3), the desorption process is terminated. Thus, the desorption process can be executed until almost all the unburned fuel adsorbed by the SCR catalyst 41 is desorbed.

As described above, the control device 80 calculates the desorption amount D of the unburned fuel desorbed from the SCR catalyst 41 during execution of the desorption process on the basis of the exhaust gas temperature and subtracts the calculated desorption amount D from the fuel adsorption amount AB. Thus, the fuel adsorption amount AB after starting the desorption process is appropriately estimated.

Figure 13:
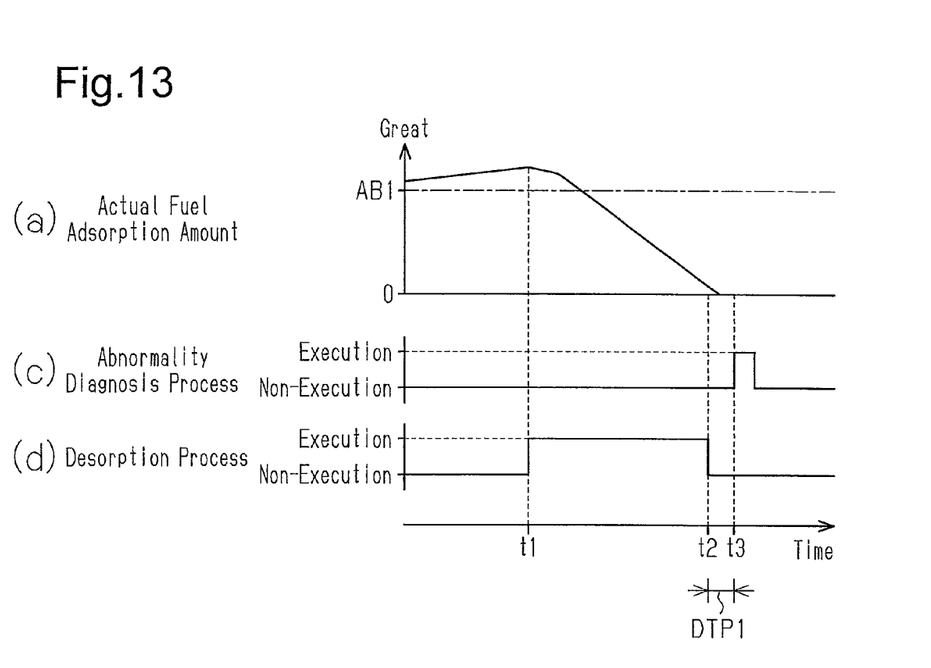
FIG. 13 is a time diagram showing a state in which the desorption process and the abnormality diagnosis process are executed according to a third embodiment.

In the above-described first and second embodiments, when the desorption process is terminated, the abnormality diagnosis process is immediately performed, that is, the termination of the desorption process substantially coincides with the starting of the abnormality diagnosis process. However, in a third embodiment, the termination of the desorption process may be shifted from the starting of the abnormality diagnosis process For example, as shown in FIG. 13, after a predetermined time DTP1 has elapsed from the point in time where the desorption process is terminated (time t2), the abnormality diagnosis process of the SCR catalyst 41 may be started (time t3). In this case, the temperature of the SCR catalyst 41 is relatively high for a short period of time after the desorption process is terminated. Thus, even if the unburned fuel slightly remains in the SCR catalyst 41 when the desorption process is terminated, the remaining unburned fuel is desorbed from the SCR catalyst 41 while the predetermined time DTP1 elapses. Thus, the unburned fuel adsorbed by the SCR catalyst 41 is sufficiently desorbed before starting the abnormality diagnosis process.

Furthermore, it takes a certain amount of time for the unburned fuel desorbed from the SCR catalyst 41 to pass through the ammonia oxidation catalyst 51. If the abnormality diagnosis process of the SCR catalyst 41 is started after the predetermined time DTP1 has elapsed from when the desorption process is terminated as described above, the abnormality diagnosis process can be started after all the unburned fuel desorbed from the SCR catalyst 41 has passed through the ammonia oxidation catalyst 51. This reliably suppresses the occurrence of an erroneous diagnosis regarding abnormality due to degradation of the SCR catalyst 41 that is caused by the NOx reduction reaction with the unburned fuel in the ammonia oxidation catalyst 51.

Figure 14:
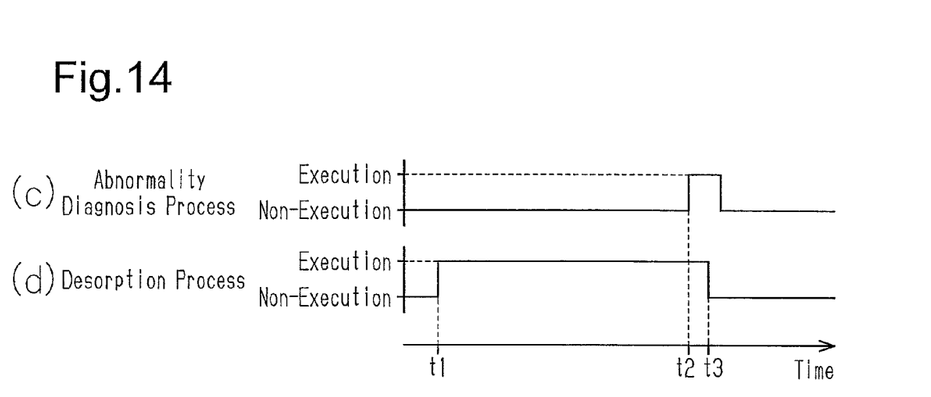
FIG. 14 is a time diagram showing a state in which the desorption process and the abnormality diagnosis process are executed according to a fourth embodiment.

When a certain amount of execution time of the desorption process has elapsed, the amount of unburned fuel adsorbed by the SCR catalyst 41 is reduced to a degree that can reduce adverse effects on the abnormality diagnosis process of the SCR catalyst 41 to some extent. In a fourth embodiment shown in FIG. 14, the abnormality diagnosis process of the SCR catalyst 41 may be started earlier (time t2) than the point in time where the desorption process is terminated (time t3). In this case also, the desorption process is performed prior to execution of the abnormality diagnosis process. Thus, the occurrence of an erroneous diagnosis during execution of the abnormality diagnosis process is suppressed as compared to a case in which the desorption process is not executed.

In each of the above-described embodiments, the NOx removal efficiency is obtained from the first NOx concentration N1 and the second NOx concentration N2. That is, the NOx removal efficiency is obtained on the basis of the amount of NOx contained in the exhaust gas that flows into the SCR catalyst 41 and the amount of NOx contained in the exhaust gas that has passed through the ammonia oxidation catalyst 51. In addition, the amount of NOx contained in the exhaust gas that has passed through the ammonia oxidation catalyst 51 is increased as the SCR catalyst 41 is degraded. Thus, to further simplify the configuration, the NOx removal efficiency may be obtained using the amount of NOx contained in the exhaust gas that has passed through the ammonia oxidation catalyst 51.

In each of the above-described embodiments, the desorption process is performed when the fuel adsorption amount AB is greater than or equal to the threshold value AB1. However, the comparative diagnosis process of the fuel adsorption amount AB and the threshold value AB1 may be omitted, and the desorption process may always be executed prior to execution of the abnormality diagnosis process if the execution condition of the abnormality diagnosis process is met. In this case also, the advantages other than the above-described advantages (2) and (3) are obtained. In this case, the estimation of the fuel adsorption amount AB can also be omitted.

In each of the above-described embodiments, measurement of the desorption time DT is started when the bed temperature ST reaches the threshold value THα after starting the desorption process. However, the measurement of the desorption time DT may be started immediately at the starting of the desorption process.

Even if unburned fuel remains in the SCR catalyst 41, the desorption process does not necessarily have to be executed until the unburned fuel adsorbed by the SCR catalyst 41 becomes zero, as long as the remaining amount is relatively small and does not adversely affect the abnormality diagnosis process of the SCR catalyst 41. For example, the desorption process may be terminated when the unburned fuel adsorbed by the SCR catalyst 41 is reduced to an allowable remaining amount.

In each of the above-described embodiments, the first NOx concentration N1 is detected by the first NOx sensor 130, but may be estimated in accordance with the engine operating condition.

In the exhaust purifying apparatus of the above-described embodiments, the number of the oxidation catalyst 31, the filter 32, the SCR catalyst 41, and the ammonia oxidation catalyst 51 may be changed as required.

Therefore, the present examples and embodiments are to be considered as illustrative and not restrictive and the disclosure is not to be limited to the examples and embodiments given herein.

The invention claimed is:

1. An exhaust purifying apparatus for an internal combustion engine, the exhaust purifying apparatus comprising:
a NOx removing catalyst, which is located in an exhaust passage and removes NOx in exhaust gas using urea water added to the exhaust gas;
an oxidation catalyst, which is located at a part of the exhaust passage downstream of the NOx removing catalyst; and
a processor, which is configured to:
calculate an amount of NOx contained in the exhaust gas that has passed through the oxidation catalyst;
execute an abnormality diagnosis process that determines that there is an abnormality in the NOx removing catalyst if NOx removal efficiency obtained from the calculated amount of NOx is less than or equal to a predetermined value; and
execute the abnormality diagnosis process after executing a desorption process that desorbs unburned fuel adsorbed by the NOx removing catalyst if an execution condition previously set for performing the abnormality diagnosis process is met.

2. The exhaust purifying apparatus according to claim 1, wherein the processor is configured to:
measure an execution time of the desorption process; and
execute the desorption process until the measured execution time reaches a predetermined threshold value.

3. The exhaust purifying apparatus according to claim 1, wherein the processor is configured to:
calculate an adsorption amount of unburned fuel in the NOx removing catalyst based on an engine operating condition; and
execute the desorption process, prior to executing the abnormality diagnosis process, if the calculated adsorption amount of the unburned fuel is greater than or equal to a predetermined amount.

4. The exhaust purifying apparatus according to claim 3, wherein the processor is configured to execute the abnormality diagnosis process without first executing the desorption process when the calculated adsorption amount is less than the predetermined amount.

5. The exhaust purifying apparatus according to claim 3, wherein:
the processor is configured to execute an adsorption amount estimation process that calculates an estimated value of the adsorption amount based on an engine rotational speed and an engine load; and
the processor is configured to, if the engine operating condition is in a transient state during the adsorption amount estimation process, calculate a correction value based on an air-fuel ratio of an air-fuel mixture and a temperature of the NOx removing catalyst and to correct the estimated value with the calculated correction value.

6. The exhaust purifying apparatus according to claim 1, wherein the processor is configured to:
calculate an adsorption amount of unburned fuel in the NOx removing catalyst from when the desorption process is started; and
execute the desorption process until the calculated adsorption amount becomes less than or equal to a predetermined amount.

7. The exhaust purifying apparatus according to claim 6, wherein:
the processor is configured to execute an adsorption amount estimation process that calculates an estimated value of the adsorption amount based on an engine rotational speed and an engine load;
the processor is configured to, if the engine operating condition is in a transient state during the adsorption amount estimation process, calculate a correction value based on an air-fuel ratio of the exhaust gas and a temperature of the NOx removing catalyst and to correct the estimated value with the calculated correction value;
the processor is configured to further execute a desorption amount estimation process that estimates a desorption amount of unburned fuel desorbed from the NOx removing catalyst during execution of the desorption process based on an exhaust gas temperature; and
the processor is configured to calculate the adsorption amount of unburned fuel in the NOx removing catalyst from when the desorption process is started by subtracting the desorption amount from the estimated value of the adsorption amount at the time of start of the desorption process.

8. The exhaust purifying apparatus according to claim 1, wherein the processor is configured to execute, as the desorption process, a temperature increase process that increases a temperature of the exhaust gas that flows into the NOx removing catalyst.

9. The exhaust purifying apparatus according to claim 8, wherein:
a filter that traps particulate matter in the exhaust gas is provided in the exhaust passage upstream of the NOx removing catalyst;
the exhaust purifying apparatus is configured to execute a regeneration process, which reduces an amount of the particulate matter that has accumulated in the filter by increasing the temperature of the exhaust gas that flows into the filter; and
the processor is configured to execute the regeneration process as the temperature increase process.

10. The exhaust purifying apparatus according to claim 8, wherein the processor is configured to execute, as the temperature increase process, a process that retards a fuel injection timing of the internal combustion engine.

11. The exhaust purifying apparatus according to claim 8, wherein:
the internal combustion engine includes an exhaust gas recirculation apparatus that returns some of the exhaust gas to an intake passage; and
the processor is configured to execute, as the temperature increase process, a process that increases the amount of the exhaust gas that is returned to the intake passage by the exhaust recirculation apparatus.

12. The exhaust purifying apparatus according to claim 8, wherein the processor is configured to execute, as the temperature increase process, a process that reduces an intake air amount of the internal combustion engine.

* * * * *